US011795363B2

(12) United States Patent
Murakami et al.

(10) Patent No.: US 11,795,363 B2
(45) Date of Patent: Oct. 24, 2023

(54) SILICA-BASED ADDITIVE FOR CEMENTING COMPOSITION, CEMENTING COMPOSITION, AND CEMENTING METHOD

(71) Applicant: NISSAN CHEMICAL CORPORATION, Tokyo (JP)

(72) Inventors: Satoru Murakami, Sodegaura (JP); Masaki Kimata, Sodegaura (JP); Isao Oota, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 270 days.

(21) Appl. No.: 17/277,354

(22) PCT Filed: May 29, 2019

(86) PCT No.: PCT/JP2019/021383
§ 371 (c)(1),
(2) Date: Mar. 18, 2021

(87) PCT Pub. No.: WO2020/059213
PCT Pub. Date: Mar. 26, 2020

(65) Prior Publication Data
US 2022/0025243 A1    Jan. 27, 2022

(30) Foreign Application Priority Data
Sep. 18, 2018 (JP) .................................. 2018-173939

(51) Int. Cl.
| | |
|---|---|
| *C09K 8/467* | (2006.01) |
| *C04B 14/06* | (2006.01) |
| *C04B 28/02* | (2006.01) |
| *E21B 33/14* | (2006.01) |
| *C04B 103/60* | (2006.01) |
| *C04B 111/00* | (2006.01) |
| *C04B 111/20* | (2006.01) |

(52) U.S. Cl.
CPC ............ *C09K 8/467* (2013.01); *C04B 14/062* (2013.01); *C04B 28/02* (2013.01); *E21B 33/14* (2013.01); *C04B 2103/60* (2013.01); *C04B 2111/00706* (2013.01); *C04B 2111/2084* (2013.01)

(58) Field of Classification Search
CPC ....... C09K 8/467; C04B 14/062; C04B 28/02; C04B 2103/60; C04B 2111/00706; C04B 2111/2084; E21B 33/14
See application file for complete search history.

(56) References Cited

U.S. PATENT DOCUMENTS

| | | | |
|---|---|---|---|
| 5,149,370 A | 9/1992 | Olaussen et al. | |
| 8,834,624 B2 | 9/2014 | Soltanian et al. | |
| 2010/0273912 A1* | 10/2010 | Roddy .................. | C09K 8/467 |
| | | | 523/130 |
| 2012/0308824 A1 | 12/2012 | Matsukubo et al. | |
| 2014/0332217 A1 | 11/2014 | Rahman et al. | |
| 2015/0322328 A1* | 11/2015 | Boul ..................... | C09K 8/426 |
| | | | 166/278 |
| 2016/0362594 A1* | 12/2016 | Rojas ...................... | C09K 8/46 |
| 2017/0002257 A1 | 1/2017 | Pisklak et al. | |
| 2017/0141407 A1 | 5/2017 | Taniguchi et al. | |
| 2017/0203971 A1* | 7/2017 | Sakatani ................ | F28F 13/00 |
| 2019/0330068 A1 | 10/2019 | Sakatani et al. | |

FOREIGN PATENT DOCUMENTS

| | | |
|---|---|---|
| CA | 2412949 A1 | 12/2001 |
| CN | 106660811 A | 5/2017 |
| JP | 4146719 B2 | 9/2008 |
| JP | 2011-173779 A | 9/2011 |
| JP | 2012-111869 A | 6/2012 |
| JP | 2013-224225 A | 10/2013 |
| JP | 2017-508709 A | 3/2017 |
| WO | 2015/151714 A1 | 10/2015 |

OTHER PUBLICATIONS

Apr. 25, 2022 Office Action Issued in Chinese Patent Application No. 201980060921.8.
Nanomaterial Information Provision Sheet; Noncrystalline Colloidal Silica; Nissan Chemical Corporation; 2019; Online: <URL: https//www.meti.go.jp/policy/chemical_management/files/nanomaterial/2016.SiO3.pdf>.
Jul. 23, 2019 Search Report issued in International Patent Application No. PCT/JP2019/021383.
Jul. 23, 2019 Written Opinion of the International Searching Authority issued in International Patent Application No. PCT/JP2019/021383.
Jan. 25, 2023 Office Action Issued in Japanese Patent Application No. 2020-547956.
Mar. 12, 2023 Office Action issued in Saudi Arabian Patent Application No. 521421510.
Journal of the Society of Inorganic Materials, Japan; 2007; p. 463-469; vol. 14.

\* cited by examiner

*Primary Examiner* — Crystal J. Lee
(74) *Attorney, Agent, or Firm* — Oliff PLC

(57) ABSTRACT

An additive capable of suppressing generation of free water from a cement slurry even under a high temperature environment of 150° C. or more and a silica-based additive that suppresses, in a cement slurry for cementing in oil fields and gas oil fields, free water under high temperature and high pressure environments of 100° C. or more, the silica-based additive containing an aqueous silica sol containing nanosilica particles with a true density of 2.15 g/cm$^3$ or more and less than 2.30 g/cm$^3$, and a cement slurry for cementing that contains the silica-based additive.

8 Claims, No Drawings

SILICA-BASED ADDITIVE FOR CEMENTING COMPOSITION, CEMENTING COMPOSITION, AND CEMENTING METHOD

TECHNICAL FIELD

The present invention relates to, in a cement slurry for cementing used when drilling a well in fields of oil fields and gas oil fields in high temperature and high pressure environments, a silica-based additive for the cement slurry that realizes excellent fluidity and strength by suppressing generation of free water from the slurry.

BACKGROUND ART

In well drilling of oil fields, gas fields and the like, when finishing the well, a cementing operation is carried out in which a cement slurry is injected into a void (annular gap: sometimes called annulus or the like) between a casing pipe and a stratum (side wall), for fixing and reinforcing the casing pipe inserted as an inner frame in the well, preventing corrosion, or preventing flowing of groundwater into the well. Cementing refers to application of a cement slurry made of cement and water or dissolved water containing an additive to various locations in the well or inside and outside the casing, and is classified into primary cementing and secondary cementing. As described above, the primary cementing refers to cementing in which a casing annulus portion (outside) is filled with cement after the casing is lowered, and is always carried out in normal casing. Further, the secondary cementing is a secondary cementing after that, and refers to cementing that is locally performed as needed.

In well drilling of oil fields, gas fields and the like, drilling operations using bits (drilling tools) and the above cementing operations are repeatedly carried out, and as the oil well becomes deeper, the temperature at the operation site rises and the pressure also rises. In recent years, drilling technology has improved, and deep oil field and gas oil field layers with a depth of 500 m to 1000 m or more have been drilled, and it is required to design a cement slurry that enables cementing even under high temperature and high pressure environments. Moreover, in recent years, frequency of horizontal wells is increasing, in which it is possible to horizontally dig production layers of oil field and gas oil field layers to increase the production volume. Unlike conventional vertical wells and inclined wells, horizontal wells require attention to a muddy water condition during drilling and cement slurry design used for cementing.

A cement slurry for cementing is designed according to the well conditions as described above, and prepared by adding, in addition to cement and water, additives such as a cement set accelerator, a cement set retarding agent, a low specific gravity aggregate, a high specific gravity aggregate, a cement dispersant, a cement dehydration regulator, a cement strength stabilizer, and a lost circulation preventing agent.

Also, cement used for cementing (also referred to as oil well cement, geothermal well cement, or the like) has different performance requirements from cement for general structure, and for example, it is required to have execution properties and durability such as slurry fluidity and strength development even under high temperature and high pressure.

As a standard considering such performance requirements, API standard (standard for petroleum established by the American Petroleum Institute) defines various oil well cements by class and sulfate resistance, among which class G cement is the most used cement for oil well drilling.

However, even if the above API standard is satisfied, the amount of free water generated from a cement slurry increases in high temperature and high pressure environments, and as a result, the fluidity and cement strength of the cement slurry are impaired. Thus, there is a need for means capable of suppressing generation of free water even in the above well environment.

So far, as an additive that suppresses generation of free water from a cement slurry, there have been proposals of using aqueous silica sol with a particle size of about 3 nm to 20 nm, or a polymer such as ABS resin (acrylonitrile-butadiene-styrene copolymer resin) or ASA resin (acrylonitrile-styrene-acrylate copolymer resin).

For example, as a proposal for suppressing free water from a cement slurry by adding colloidal silica (silica sol), Patent Document 1 discloses a cement slurry added with colloidal silica with a specific surface area of about 50 $m^2/g$ to 1000 $m^2/g$ at a ratio of about 1% to about 30% based on dry weight of the cement. It is disclosed that the slurry had 0% to 3.2% free water after conditioning (curing at a predetermined temperature) at 25° C. to 91° C.

Patent Document 2 discloses a building material containing a hydraulic binder, water and aluminum-modified colloidal silica containing 0.05 wt % to 3 wt % $Al_2O_3$ (road, tunnel, bridge, building, well cement fixation, and the like). Patent Document 2 discloses that the cement slurry containing aluminum-modified colloidal silica with a specific surface area of 80 $m^2/g$ to 900 $m^2/g$ was a slurry having good fluidity and virtually no free water (however, the temperature conditions are not disclosed).

Patent Document 3 discloses that a low-density to ultra-low-density cement composition (cement slurry) containing cement, hydrophobic nanosilica with a specific surface area of about 110 $m^2/g$ to about 260 $m^2/g$ and a particle size of 1 nm to 100 nm, at least one additive, and water had high compressive strength, low porosity, low free water and low dehydration amount, and quick thickening time. For example, in Example 3, it is disclosed that, in a cement slurry obtained by blending with class H cement hydrophobic nanosilica with a specific surface area of 180 $m^2/g$ and a particle size of 20 nm at 5% based on dry weight of the cement, and glass fine particles of 115 μm at 70% based on dry weight of the cement, the amount of free water at 25° C. was 0 cc.

Further, Non Patent Document 1 describes that, while the number of cases where a production layer is excavated horizontally is increasing, as a measure to improve replacement efficiency of drilling mud with a cement slurry when excavating the production layer horizontally, and reduce material separation (including free liquid) in the slurry, colloidal silica with a particle size of 0.05 μm and a specific surface area of 500 $m^2/g$ was added to class G cement (specific gravity of the cement slurry was 1.89), and actual execution was carried out at a horizontal part (length of about 1500 m).

Further, Patent Document 4 discloses gypsum, water soluble carboxyalkyl, hydroxyalkyl, mixed carboxyalkyl/hydroxyalkyl either of cellulose, polyvalent metal salts, zirconium oxychloride with hydroxyethyl cellulose, or a combination thereof, as specific examples of thixotropic additives for controlling free water of a cement composition.

PRIOR ART DOCUMENTS

Patent Documents

Patent Document 1: U.S. Pat. No. 5,149,370
Patent Document 2: Japanese Patent No. 4146719
Patent Document 3: U.S. Pat. No. 8,834,624
Patent Document 4: Japanese Patent Application Publication No. 2017-508709

Non-Patent Documents

Non-Patent Document 1: Journal of the Society of Inorganic Materials, Japan Vol. 14, 2007, p. 464

SUMMARY OF THE INVENTION

Problems to be Solved by the Invention

In aqueous silica sol disclosed so far, for example, aqueous silica sol with a particle size of about 3 nm to 20 nm, the silica sol gelates at 105° C. or more. Also, the above-mentioned polymer material has heat resistant temperatures of ABS resin of about 100° C., and ASA resin of about 150° C., and it is said that an effect of suppressing the generation of free water is lost under a high temperature environment of 150° C. or more. Although the above-mentioned Patent Documents 1 to 3 and Non-Patent Document 1 describe that free water was suppressed by blending silica, it cannot be confirmed that it was possible to suppress free water under a temperature environment of 150° C. or more.

In addition, hydrophobic silica described in Patent Document 3 generally needs to be surface-treated with a hydrophobic silane compound in silica sol dispersed in an organic solvent, which makes production itself expensive, and there is a concern that miscibility with a water-based cement slurry will be low.

Further, hydroxyethyl cellulose, which is a water-soluble hydroxyalkyl cellulose described in Patent Document 4, also has a melting point of 140° C., and it is presumed that the effect of suppressing the generation of free water is lost when it exceeds 140° C.

The present invention is directed to an additive to be blended in a cement slurry for cementing in oil fields and gas oil fields, that is, an object of the present invention is to provide an additive capable of suppressing generation of free water from a cement slurry even under high temperature environment of 100° C. or more, particularly 150° C. or more, and a cement slurry formulation blended with the additive.

Means for Solving the Problems

As a result of intensive studies by the present inventors to solve the above problems, it was found that a silica-based additive containing an aqueous silica sol containing nanosilica particles with a true density of 2.15 g/cm$^3$ or more and less than 2.30 g/cm$^3$, in a cement slurry for cementing added with the silica-based additive, has excellent fluidity without aggregation even under high temperature and high pressure environments such as 100° C. or more, particularly 150° C. or more and 300° C. or less, suppresses generation of free water from the cement slurry, can develop high cement strength, and further can suppress execution defects (the cement is thin and filling of voids is insufficient).

That is, the present invention relates to, as a first aspect, a silica-based additive that suppresses, in a cement slurry for cementing in oil fields and gas oil fields, generation of free water from the slurry under high temperature and high pressure environments of 100° C. or more and 300° C. or less, the silica-based additive containing an aqueous silica sol containing nanosilica particles with a true density of 2.15 g/cm$^3$ or more and less than 2.30 g/cm$^3$.

The present invention relates to, as a second aspect, the silica-based additive according to the first aspect, in which the nanosilica particles have a specific surface area value by nitrogen adsorption (BET (N$_2$)) of 10 m$^2$/g to 500 m$^2$/g and a specific surface area value by water vapor adsorption (BET (H$_2$O)) of 5 m$^2$/g to 65 m$^2$/g.

The present invention relates to, as a third aspect, the silica-based additive according to the first aspect or the second aspect, in which the nanosilica particles have a Q4 value of silica measured by solid $^{29}$Si-NMR of 35 mol % to 80 mol %.

The present invention relates to, as a fourth aspect, the silica-based additive according to any one of the first aspect to the third aspect, in which the nanosilica particles have an equivalent sphere-converted particle size calculated from BET (N$_2$) of 5 nm to 100 nm and a particle size by dynamic light scattering method of 10 nm to 200 nm.

The present invention relates to, as a fifth aspect, a cement slurry for cementing, containing the silica-based additive according to any one of the first aspect to the fourth aspect at a ratio of 0.1% BWOC to 10% BWOC (BWOC means % by mass based on a dry solid content of cement) as a silica solid content, based on 100 parts of oil well cement.

The present invention relates to, as a sixth aspect, a cement slurry for cementing, containing the silica-based additive according to any one of the first aspect to the fourth aspect at a ratio of 0.1% BWOC to 10% BWOC as a silica solid content, water at a ratio of 30% BWOC to 60% BWOC, a cement set retarding agent at a ratio of 0.1% BWOC to 5% BWOC and other additives at a ratio of 0.001% BWOC to 10% BWOC, respectively, based on 100 parts of oil well cement, in which the other additives are at least one additive selected from the group consisting of dehydration regulators, defoamers, set accelerators, low specific gravity aggregates, high specific gravity aggregates, cement dispersants, cement strength stabilizers, and lost circulation preventing agents.

The present invention relates to, as a seventh aspect, a cementing construction method, in which the cement slurry for cementing according to the fifth aspect or the sixth aspect is used as a cement slurry for cementing to fill a void part between a stratum and a casing pipe with oil well cement when oil or gas is mined under high temperature and high pressure environments of 100° C. or more and 300° C. or less, in drilling of an oil field or gas oil field.

The present invention relates to, as an eighth aspect, a cementing method including the steps of:
introducing the cement slurry for cementing according to the fifth aspect or the sixth aspect into a well, and
condensing the cement slurry for cementing.

Effects of the Invention

The silica-based additive of the present invention can suppress generation of free water from a cement slurry, when the cement slurry for cementing added with the silica-based additive is used during drilling in a high-temperature/high-pressure oil layer of 100° C. or more, particularly 150° C. or more and 300° C. or less, has excellent fluidity and realizes high cement strength, and can suppress execution defects (for example, the cement is too thin to fill a gap with a stratum, and fixation of casing is insufficient).

Therefore, by using the silica-based additive of the present invention in the cement slurry for cementing, well completion can be stably carried out with good productivity even under high temperature and high pressure environments.

MODES FOR CARRYING OUT THE INVENTION

The silica-based additive of the present invention is characterized by containing an aqueous silica sol containing nanosilica particles with a true density of 2.15 g/cm$^3$ or more and less than 2.30 g/cm$^3$.

Hereinafter, the silica-based additive of the present invention will be described in detail.

<Aqueous Silica Sol Containing Nanosilica Particles>

The aqueous silica sol refers to a colloidal dispersion system using an aqueous solvent as a dispersion medium and colloidal silica particles as a dispersoid, and can be produced by a known method using water glass (aqueous sodium silicate solution) as a raw material.

The nanosilica particles (colloidal silica particles) contained in the aqueous silica sol used as the silica additive of the present invention are characterized by having a true density of 2.15 g/cm$^3$ or more and less than 2.30 g/cm$^3$.

The true density is a density in which only a volume occupied by a substance itself is used as a volume for density calculation. For example, pores and internal voids contained in porous substance are not included in the volume for density calculation, and the true density will be low unless structure of the particles is dense. The colloidal silica particles change in microstructure (pore structure) depending on conditions of their preparation process and heat treatment after preparation. For example, as commercially available silica particles, those with a true density of about 2.0 g/cm$^3$ or less are known. Here, silicon dioxide ($SiO_2$) has a true density of 2.20 g/cm$^3$, and the closer to this value, the denser the structure (less pores and internal voids) of the silica particles.

In the measurement of the true density in the present specification, an average value when measured 10 times by a constant volume expansion method using helium gas was taken as the true density.

The nanosilica particles have a specific surface area value by nitrogen adsorption (referred to as BET ($N_2$)) of preferably 10 m$^2$/g to 500 m$^2$/g, and for example, 30 m$^2$/g to 300 m$^2$/g, or 40 m$^2$/g to 200 m$^2$/g.

Further, the nanosilica particles have a specific surface area value by water vapor adsorption (referred to as BET ($H_2O$)) of preferably 5 m$^2$/g to 65 m$^2$/g, and for example, 10 m$^2$/g to 50 m$^2$/g, or 15 m$^2$/g to 50 m$^2$/g. Water vapor is adsorbed on a hydroxy (OH) moiety of a silanol group in silica, and it can be said that this value reflects the abundance of silanol groups on the surface of the nanosilica particles.

The specific surface area value by nitrogen adsorption was measured by BET method, and the specific surface area by water vapor adsorption was measured by weight adsorption method.

Ratio of the specific surface area value by water vapor adsorption to the specific surface area value by nitrogen adsorption [BET ($H_2O$)/BET ($N_2$)] is effective for evaluating hydrophilicity of the surface of nanosilica particles, and it can be evaluated that the smaller this ratio, the more hydrophobic it is. For example, in the present invention, BET ($H_2O$)/BET ($N_2$) can be set to 0.1 to 1.3.

Further, the nanosilica particles have a Q4 value of silica represented by solid $^{29}$Si-NMR of preferably 35 mol % to 80 mol %, for example, 40 mol % to 80 mol %, 40 mol % to 70 mol %, 35 mol % to 70 mol %, 40 mol % to 60 mol %, or 35 mol % to 60 mol %.

In the present invention, the Q4 value of silica is evaluated by spectral analysis of solid $^{29}$Si-NMR using CP (Cross Polarization) method.

The solid $^{29}$Si-NMR is effective for grasping bonding state of solid Si compounds such as silica. The bonding state of silica can be expressed as Q2, Q3, Q4 depending on the number of Si—O—Si bonds and Si—O—H bonds (silanol groups), and Q4 corresponds to a state that all four bonds indicate Si—O—Si bonds, that is, the state in which Si does not have a hydroxy group (—OH). In the solid $^{29}$Si-NMR, peaks derived from silicon having different bonding states are detected at different positions, and by separating these peaks and calculating the area ratio, the area ratio can be regarded as an abundance ratio of Si in each bonding state. That is, the solid $^{29}$Si-NMR measurement makes it possible to quantitatively grasp the amount of silanol groups of nanosilica particles from the bonding state.

Further, in the present invention, the average particle size of the aqueous silica sol (colloidal silica particles) refers to an average particle size of colloidal silica particles which are dispersoids, and is represented by a specific surface area diameter (equivalent sphere-converted particle size calculated from BET ($N_2$)) obtained by measurement by nitrogen adsorption method and a particle size by dynamic light scattering method (DLS method).

Specific surface area diameter (equivalent sphere-converted particle size calculated from BET ($N_2$)) D (nm) obtained by measurement by nitrogen adsorption method is given from specific surface area S (m$^2$/g) measured by nitrogen adsorption method by formula of D (nm)=2720/S.

In addition, the particle size by dynamic light scattering method (DLS method) (hereinafter referred to as DLS average particle size) represents an average value of secondary particle size (dispersed particle size), and the DLS average particle size in a completely dispersed state is said to be about twice the average particle size (the specific surface area diameter obtained by measurement by nitrogen adsorption method (BET method), which represents the average value of primary particle size). Then, it can be determined that the silica particles in the aqueous silica sol are in an aggregation state as the DLS average particle size becomes larger.

In the nanosilica particles of the aqueous silica sol of the present invention, the equivalent sphere-converted particle size calculated from BET ($N_2$) is preferably 5 nm to 100 nm, and can be, for example, 10 nm to 100 nm, 20 nm to 80 nm, or 20 nm to 70 nm.

Also, the particle size by dynamic light scattering method is preferably 10 nm to 200 nm, and can be, for example, 10 nm to 100 nm, 20 nm to 100 nm, or 30 nm to 100 nm.

The aqueous silica sol can be produced by a known method as described above, and can be produced, for example, by a method of heating a silicic acid solution obtained by cation exchange of an aqueous alkali silicate solution.

The concentration of silica ($SiO_2$) in the aqueous silica sol used is not particularly limited, but can be, for example, 5% by mass to 55% by mass.

<Cement Slurry for Cementing>

The present invention is also directed to a cement slurry for cementing (cementing composition) containing the silica-based additive.

Specifically, the cement slurry for cementing of the present invention contains oil well cement and a silica-based additive, and contains the silica-based additive at a ratio of 0.1% BWOC to 10% BWOC (BWOC means % by mass based on a dry solid content of cement (By Weight of Cement)) as a silica solid content, based on 100 parts of the oil well cement.

Further, the cement slurry for cementing of the present invention may contain water, a cement set retarding agent and other additives, in addition to the oil well cement and the silica-based additive. At this time, as the blending amount of each component, it is possible to blend the silica-based additive (as a silica solid content) at a ratio of 0.1% BWOC to 10% BWOC, water at a ratio of 30% BWOC to 60% BWOC, a cement set retarding agent at a ratio of 0.1% BWOC to 5% BWOC, and other additives at a ratio of 0.001% BWOC to 10% BWOC.

As the oil well cement, any of Class A cement to Class H cement of the API (American Petroleum Institute) standard "API SPEC 10A Specification for Cements and Materials for Well Cementing" can be used. Among them, Class G cement and Class H cement are more preferable because their components are easily adjusted by additives and they can be used in a wide range of depths and temperatures.

The cement set retarding agent is used to maintain proper fluidity of the cement slurry until the end of the operation and to adjust thickening time.

The cement set retarding agent contains lignin sulfonates, naphthalene sulfonates, borates, or the like as a main component.

In addition, as other additives, at least one additive selected from the group consisting of dehydration regulators, defoamers, set accelerators, low specific gravity aggregates, high specific gravity aggregates, cement dispersants, cement strength stabilizers and lost circulation preventing agents can be contained.

The dehydration regulator can be used for the purpose of protecting a water-sensitive stratum, preventing early dehydration of the slurry, or the like, and contains an organic high-molecular polymer, a vinylamide vinyl sulfonic acid copolymer, or the like as a main component.

The defoamer contains a silicon compound, a higher alcohol, or the like as a main component.

The low specific gravity aggregate can be used for the purpose of reducing the specific gravity of the cement slurry when there is a water loss layer or a low pressure layer, or the like, and contains bentonite, gilsonite, diatomaceous earth, pearlite, hollow pearlite hollow particles, fly-ash hollow particles, alumina silicate glass hollow particles, sodium borosilicate hollow particles, alumina hollow particles, carbon hollow particles, or the like as a main component.

The high specific gravity aggregate can be used for the purpose of increasing the specific gravity of the cement slurry in order to improve replacement efficiency with high-pressure layer-suppressing muddy water, or the like, and contains barium sulfate, hematite, ilmenite, or the like as a main component.

Further, the cement dispersant can be used for the purpose of lowering viscosity of the cement slurry and increasing the replacement efficiency with muddy water, or the like, and contains a naphthalene sulfonic acid formalin condensate, a polyacrylic acid condensate, a sulfonated melamine condensate, or the like as a main component.

The cement strength stabilizer contains fly ash, silica, or the like as a main component.

The lost circulation preventing agent is used to prevent water loss, includes inert granules that do not affect properties of cement, and contains walnut shells, vermiculite, gilsonite, mica, cellophane waste, or the like as a main component.

In addition, the cement set accelerator is used for the purpose of increasing an initial strength, shortening waiting time for curing, or the like, and contains calcium chloride, water glass, gypsum, or the like as a main component.

Further, the cement slurry for cementing of the present invention may contain, in addition to the above oil well cement, silica-based additive, cement set retarding agent and other additives, various cements and aggregates used in cement compositions and concrete compositions for general structure, and other additives used in these cement compositions and the like.

For example, as a conventional cement for general structure, Portland cement (for example, ordinary Portland cement, high-early-strength Portland cement, ultra-high-early-strength Portland cement, low-heat/moderate-heat Portland cement, sulfate-resistant Portland cement, or the like), various mixed cement (blast furnace cement, silica cement, fly ash cement, or the like), white Portland cement, alumina cement, super-fast-setting cement (one-clinker rapid-hardening cement, two-clinker rapid-hardening cement, magnesium phosphate cement), cement for grout, low-exothermic cement (for example, low-exothermic blast furnace cement, fly ash mixing low-exothermic blast furnace cement, and high content belite cement), ultra-high strength cement, a cement-based solidifying material, eco-cement (cement produced from one or more kinds of municipal wastes incinerated ash and sewage sludge incineration ash as a raw material) or the like may be used, and further, fine powders such as blast furnace slag, fly ash, cinder ash, clinker ash, husk ash, silica fume, silica powder and limestone powder and gypsum may be added as an admixture.

Also, as the aggregate, other than gravel, crushed stone, granulated slag, recycled aggregate and the like, a fire-resistant aggregate such as silica stone, clay, zircon base, high alumina base, silicon carbide base, graphite, chromium, chromium-magnesite or magnesia can be used.

As other additives used in cement compositions and the like, it is possible to blend known cement/concrete additives such as a high-performance AE water reducing agent, a high-performance water reducing agent, an AE water reducing agent, a water reducing agent, an air entraining agent (AE agent), a foaming agent, a separation reducing agent, a thickening agent, a shrinkage reducing agent, a curing agent, a water repellent and the like.

<Cementing Construction Method>

The present invention is also directed to a cementing construction method using the above-mentioned cement slurry for cementing.

Specifically, the cementing construction method of the present invention is characterized by using the above-mentioned cement slurry for cementing as a cement slurry for cementing to fill a void part between a stratum and a casing pipe with oil well cement when oil or gas is mined under high temperature and high pressure environments of 100° C. or more, particularly 150° C. or more and 300° C. or less, in drilling of an oil field or gas oil field.

<Cementing Method>

The present invention is also directed to a cementing method including the steps of introducing the above-mentioned cement slurry for cementing into a well, and condensing the cement slurry for cementing.

As described above, the silica-based additive of the present invention contains nanosilica particles with a true density of 2.15 g/cm$^3$ or more and less than 2.30 g/cm$^3$, that is, nanosilica particles of which structure is dense (with few pores and internal voids), which seem to have few silanol groups exposed to the surface. Furthermore, also based on the characteristics that the nanosilica particles has a specific surface area value by water vapor adsorption (BET ($H_2O$)) of preferably 5 m$^2$/g to 65 m$^2$/g, and a Q4 value of silica represented by solid $^{29}$Si-NMR of preferably 35 mol % to 80 mol %, it can be said that the particles are nanosilica particles having a relatively small amount of silanol groups and having relatively low surface hydrophilicity.

It is considered that when the silica-based additive of the present invention containing nanosilica particles having such properties is blended with a cement slurry for cementing and the slurry is used under an environment of 100° C. or more, particularly 150° C. or more and 300° C. or less, as compared with the case of adding commercially available silica particles having a hydrophilic surface, silica sol containing nanosilica particles having a surface with reduced hydrophilicity has a higher effect of taking in water to form a hydrated gel, and an effect of suppressing generation of free water from the cement slurry is more exerted.

EXAMPLES

Hereinafter, the present invention will be described in more detail based on synthesis example, examples and comparative examples, but the present invention is not limited to these examples.

(Measuring Device/Method)

Analysis (silica concentration, pH value, DLS average particle size, viscosity, specific surface area by nitrogen adsorption method, specific surface area by water vapor adsorption method) of aqueous silica sol prepared in synthesis example was performed using the following devices.

Silica solid content concentration: After removing an alkali content of the aqueous silica sol with a hydrogen-type cation exchange resin, silica solid content concentration was determined from 1000° C. baking residue of the dried product.

pH: A pH meter (manufactured by DKK-TOA CORPORATION) was used.

Viscosity: An Ostwald viscometer (manufactured by Shibata Scientific Technology Ltd.) was used.

DLS Average particle size (dynamic light scattering method particle size): A dynamic light scattering method particle size measuring device Zetasizer Nano (manufactured by Malvern Panalytical Ltd, Spectris Co., Ltd.) was used.

Specific surface area by nitrogen adsorption method: After removing water-soluble cations in the aqueous silica sol with a cation exchange resin, a sample dried at 290° C. was used as a measurement sample, and a specific surface area measuring device by nitrogen adsorption method Monosorb (manufactured by Quantachrome Instruments Japan G.K.) was used.

Specific surface area by water vapor adsorption method: After removing water-soluble cations and anions in the aqueous silica sol with resins, in the order of a cation exchange resin, an anion exchange resin, and a cation exchange resin, a sample dried at 290° C. was used as a measurement sample, and a specific surface area measuring device by water vapor adsorption method Q5000SA (manufactured by TA Instruments Japan Inc.) was used.

True density: After removing water-soluble cations in the aqueous silica sol with a cation exchange resin, a sample dried at 150° C. was used as a measurement sample, and true density was measured by a constant volume expansion method using AccuPyc™ 1330 Pycnometer (manufactured by Micromeritics Instrument Corporation).

Q4 value measured by solid $^{29}$Si-NMR of silica: After removing water-soluble cations in the aqueous silica sol with a cation exchange resin, a sample dried at 150° C. was used as a measurement sample, and solid $^{29}$Si-NMR was measured by CP (Cross Polarization) method using a nuclear magnetic resonance apparatus (NMR) AVANCE III 500 (manufactured by BRUKER ANALYTIK GmbH). From the obtained solid $^{29}$Si-NMR spectrum of silica, the ratio of Q4 value was calculated.

Synthesis Example

Preparation of Aqueous Silica Sol

A 3 L-glass reactor equipped with a stirrer, a condenser and a dropping funnel was charged with commercially available industrial water glass with a $SiO_2/Na_2O$ molar ratio of 3.3 and pure water to prepare 357 g of an aqueous sodium silicate solution with a $SiO_2$ concentration of 3.0% by mass, and the liquid temperature was kept heated under stirring. Separately, the diluted aqueous sodium silicate solution was treated with a hydrogen-type cation exchange resin to prepare 1,414 g of an aqueous colloidal aqueous solution of active silicate at room temperature with a $SiO_2$ concentration of 3.6% by mass and a pH of 2.8, and this was immediately added to the aqueous sodium silicate solution in the reactor using a metering pump while heating and holding over 6 hours to produce a reaction mixture. Subsequently, the reaction mixture was heated and aged for 1 hour while keeping the heating. Then, after adding 23 g of an 8% by mass sulfuric acid aqueous solution to this reaction mixture, the mixture was aged for 30 minutes by keeping the heating. Next, using a commercially available ultrafiltration device (manufactured by ADVANTEC TOYO KAISHA, LTD.) equipped with a tubular ultrafiltration membrane made of polysulfone, the mixture was concentrated to the silica solid content concentration ($SiO_2$ concentration) shown in Table 1 to produce an aqueous silica sol. By changing the above heating and holding temperature, five types of aqueous silica sols, silica sol A, silica sol B, silica sol C, silica sol D, and silica sol E, were produced. Table 1 shows physical characteristics of each aqueous silica sol.

TABLE 1

|  |  | Silica sol | | | | |
| --- | --- | --- | --- | --- | --- | --- |
|  |  | A | B | C | D | E |
| Silica solid content concentration | % by mass | 22.3 | 295 | 40.4 | 20.5 | 30.5 |
| pH | — | 9.9 | 11 | 9.7 | 9.5 | 10.1 |
| Viscosity | mPa·s | 2.4 | 1.8 | 3.2 | 2.3 | 3.5 |
| DLS Average particle size | nm | 47 | 74 | 78 | 5 | 45 |
| Average particle size (BET converted particle size) | nm | 27 | 61 | 49 | 6.5 | 28 |
| BET ($N_2$) | $m^2/g$ | 101 | 45 | 51 | 420 | 97 |
| BET ($H_2O$) | $m^2/g$ | 44.4 | 21.3 | 60.5 | 513 | 64.5 |
| True density | $g/cm^3$ | 2.17 | 2.22 | 2.19 | 1.80 | 2.13 |
| Solid $^{29}$Si-NMR of silica Q4 value | mol % | 45 | 51 | 38 | 30 | 37 |

Examples 1 to 6, Comparative Examples 1 to 7

Preparation of Cement Slurry

Cement slurries were prepared in accordance with API standard (standard for petroleum established by the American Petroleum Institute) 10B-2, using a dedicated device and the materials and charge amounts shown in Tables 2 and 3. That is, pure water was put into a dedicated mixer, and while rotating a stirring blade at 4,000 rpm, a commercially available dehydration regulator, an aqueous silica sol, a commercially available set retarding agent, and a defoamer and Class G cement (manufactured by UBE-MITSUBISHI CEMENT CORPORATION) were put thereinto in 90 seconds at the blending amounts shown in Table 2. Thereafter, the rotation speed of the stirring blade was increased to 12,000 rpm, and the mixture was stirred for 35 seconds to prepare a cement slurry.

For each prepared cement slurry, fluidity was evaluated by the following procedure, and further, amount of free water (free water), thickening time test, cement strength (ultrasonic strength measurement), and fluid loss were evaluated in accordance with the API standard, using a dedicated device.

The obtained results are shown in Tables 2 and 3.

1) Evaluation of Fluidity of Cement Slurry 500 cc of the prepared cement slurry was separated and put into Model 290 HPHT (High-Pressure, High-Temperature) Consistometer (manufactured by Fann Instrument Company), which is a high-temperature and high-pressure thickening time measuring device described in the API standard, and then the temperature and pressure were raised to 150° C., 3,700 psi or 180° C., 5,000 psi over 1 hour, and the same temperature was maintained for 30 minutes for conditioning (curing at a predetermined temperature and pressure).

After maintaining high temperature and high pressure for 30 minutes, the cement slurry was cooled to 88° C. over 30 minutes, and the pressure was released to atmospheric pressure. Thereafter, when the cement slurry was taken out from the device, appearance of the cement slurry and the stirring blade were visually observed, and the fluidity was evaluated according to the following evaluation criteria.

<<Evaluation Criteria of Fluidity>>

A: Cement slurry is liquid (maintains fluidity even without stirring)

B: Cement slurry is semi-solid (fluidity is obtained by stirring)

C: Cement slurry is solid (no fluidity is obtained even by stirring)

2) Measurement of Amount of Free Water (Free Water)

After conditioning the cement slurry by the method described in 1) Evaluation of fluidity of cement slurry above, the cement slurry was cooled to 88° C. over 30 minutes, and the pressure was released to atmospheric pressure. Thereafter, the cement slurry was taken out from the device, 250 cc of the cement slurry was put into a resin graduated cylinder with a target capacity of 250 cc, and the graduated cylinder was tilted at 45 degrees and allowed to stand for 2 hours. Water released on the upper part of the slurry was collected with a dropper at 2 hours after standing, and its amount (% by volume based on 250 cc of slurry) was taken as the amount of free water.

Although the API standard does not have any special provisions on a numerical range of the amount of free water, 2% by volume or less is preferable.

Further, in this example, those with an amount of free water exceeding 3% by volume are not suitable as cement slurries for cementing, and therefore the following evaluation is not performed.

3) Thickening Time Test 500 cc of the prepared cement slurry was separated and put into Model 290 HPHT (High-Pressure, High-Temperature) Consistometer (manufactured by Fann Instrument Company), which is a thickening time measuring device described in the API standard, and then the temperature and pressure were raised to 150° C., 3,700 psi or 180° C., 5,000 psi over 1 hour while stirring the cement slurry with a stirring blade, and were maintained at a predetermined temperature and pressure. Consistency was measured over time with the thickening time measuring device from the start of the test, and this temperature was maintained until the measured value (Bearden unit (BC)) reached 70 BC. The time from the start of heating to reaching 70 BC at this time was taken as the thickening time (hours:minutes).

Although the API standard does not have any special provisions on the thickening time, 2 hours to 6 hours are standard.

4) Measurement of Cement Strength (Compressive Strength Test)

130 cc of the prepared cement slurry was separated and put into Ultrasonic Cement Analyzer Model 304, a compression strength measuring device described in the API standard, and then the temperature and pressure were raised to 120° C., 3,700 psi, or 150° C., 5,000 psi over 1 hour, and the temperature and pressure were maintained for 3 hours. Thereafter, the temperature was raised from 120° C. to 150° C. or from 150° C. to 180° C. over 20 hours, and each compression strength measured while holding the above pressure was taken as the cement strength.

Although the API standard does not have any special provisions on a numerical range of compression strength, the standard value is over 2,000 psi.

5) Measurement of Fluid Loss

After conditioning the cement slurry by the method described in 1) Evaluation of fluidity of cement slurry above, the cement slurry was cooled to 88° C. over 30 minutes, the pressure was released to atmospheric pressure, then the cement slurry was taken out from the device, and 130 cc of the cement slurry was separated and put into Fluid Loss Test Instrument (manufactured by Fann Instrument Company), fluid loss measuring device described in the API standard. Thereafter, water (dehydration) generated from the cement slurry when a pressure of 1,000 psi was continuously applied under 88° C. conditions for 30 minutes was collected with a resin graduated cylinder with a volume of 100 cc, and dehydration amount V ($V_t$) at measurement time t (30 minutes) was applied to Formula 1 to calculate fluid loss.

$$\text{Fluid loss} = 2V_t\sqrt{\frac{30}{t}} \qquad \text{(Formula 1)}$$

$V$: Dehyration amount $t$: Measurement time (min)

Although the API standard does not have any special provisions on a numerical range of fluid loss, it is preferably about 100 ml or less.

TABLE 2

|  |  |  | Example |  |  |  |  |  |
|---|---|---|---|---|---|---|---|---|
|  |  |  | 1 | 2 | 3 | 4 | 5 | 6 |
| *1 Slurry composition | Aqueous silica sol | Type | A | B | B | B | B | C |
|  |  | Blending amount | 5.53 | 7.06 | 7.06 | 15.00 | 15.00 | 10.90 |
|  |  | Solid content conversion amount | 1.23 | 2.08 | 2.08 | 4.42 | 4.42 | 4.43 |
|  | Class G cement |  | 100.00 | 100.00 | 100.00 | 100.00 | 100.00 | 100.00 |
|  | Pure water |  | 41.49 | 40.2 | 39.95 | 32.02 | 31.77 | 35.84 |
|  | Dehydration regulator |  | 2.16 | 2.16 | 2.16 | 2.16 | 2.16 | 2.16 |
|  | Set retarding agent |  | 0.99 | 0.74 | 0.99 | 0.99 | 1.24 | 1.24 |
|  | Defoamer |  | 0.09 | 0.09 | 0.09 | 0.09 | 0.09 | 0.09 |
| True density [g/cm$^3$] |  |  | 2.17 | 2.22 | 2.22 | 2.22 | 2.22 | 2.19 |
| BET (N$_2$) [m$^2$/g] |  |  | 101 | 45 | 45 | 45 | 45 | 51 |
| BET (H$_2$O) [m$^2$/g] |  |  | 44.4 | 21.3 | 21.3 | 21.3 | 21.3 | 60.5 |
| Solid $^{29}$Si-NMR Q4 value [%] |  |  | 45 | 51 | 51 | 51 | 51 | 38 |
| Conditioning temperature [° C.] |  |  | 150 | 150 | 150 | 180 | 180 | 180 |
| Fluidity [A to D] |  |  | A | A | A | A | A | A |
| Amount of free water [% by volume] |  |  | 1.1 | 0.2 | 0.2 | 1.6 | 0.2 | 0.1 |
| Thickening time [hours:minutes] |  |  | 6:25 | 5:12 | 6:48 | 2:26 | 13:12 | Unevaluated |
| Cement strength [psi] |  |  | 2737 | 2721 | 2712 | 2081 | 2285 | Unevaluated |
| Fluid loss [ml] |  |  | 101 | 91 | *2 | 93 | 78 | 83 |

*1 Unit of the blending amount (including solid content conversion amount) of each component in the slurry composition: % BWOC
*2 Complete dehydration in 15 minutes

TABLE 3

|  |  |  | Comparative Example |  |  |  |  |  |  |
|---|---|---|---|---|---|---|---|---|---|
|  |  |  | 1 | 2 | 3 | 4 | 5 | 6 | 7 |
| *1 Slurry composition | Aqueous silica sol | Type | D | D | D | D | E | — | — |
|  |  | Blending amount | 0.41 | 0.41 | 2.03 | 4.06 | 3.99 | — | — |
|  |  | Solid content conversion amount | 0.084 | 0.064 | 0.42 | 0.83 | 1.25 | — | — |
|  | Class G cement |  | 100.00 | 100.00 | 100.00 | 100.00 | 100.00 | 100.00 | 100.00 |
|  | Pure water |  | 47.00 | 46.51 | 44.99 | 43.46 | 46.28 | 47.02 | 46.76 |
|  | Dehydration regulator |  | 2.16 | 2.16 | 2.16 | 2.16 | 2.16 | 2.16 | 2.16 |
|  | Set retarding agent |  | 0.5 | 0.99 | 0.5 | 0.5 | 0.99 | 0.99 | 1.24 |
|  | Defoamer |  | 0.09 | 0.09 | 0.09 | 0.09 | 0.09 | 0.09 | 0.09 |
| True density [g/cm$^3$] |  |  | 1.8 | 1.8 | 1.8 | 1.8 | 2.13 | — | — |
| BET (N$_2$) [m$^2$/g] |  |  | 420 | 420 | 420 | 420 | 97.0 | — | — |
| BET (H$_2$O) [m$^2$/g] |  |  | 513 | 513 | 513 | 513 | 64.5 | — | — |
| Solid $^{29}$Si-NMR Q4 value [%] |  |  | 30 | 30 | 30 | 30 | 37 | — | — |
| Conditioning temperature [° C.] |  |  | 150 | 150 | 150 | NG*2 | 150 | 150 | 150 |
| Fluidity [A to D] |  |  | B | A | A |  | A | A | A |
| Amount of free water [% by volume] |  |  | 4.2 | 27.6 | 62.4 |  | 14.2 | 14 | 19.2 |

*1 Unit of the blending amount (including solid content conversion amount) of each component in the slurry composition: % BWOC
*2 When preparing a slurry, the cement became lumpy during mixing, and a slurry could not be prepared.

As shown in Table 2, all of Examples 1 to 6 using aqueous silica sols A, B, and C containing nanosilica particles with a true density of 2.15 g/cm$^3$ or more and less than 2.30 g/cm$^3$ had excellent fluidity, and showed an amount of free water of less than 2% by volume. In addition, thickening time, cement strength, and fluid loss required for the slurry for cementing were satisfied.

In particular, Examples 2 and 3 using silica sol B resulted in an amount of free water of 0.6% by volume at 150° C. (conditioning temperature), which was very small. In addition, a low amount of free water of less than 1.6% by volume could be realized even at 180° C. (conditioning temperature), and an extremely small amount of free water of 0.2% by volume could be realized by adjusting the blending amount of the set retarding agent. Further, Example 6 using silica sol C resulted in an amount of free water of 0.1% by volume at 180° C. (conditioning temperature), which was extremely small.

On the other hand, as shown in Table 3, when using silica sol D containing nanosilica particles with a true density extremely smaller (1.80 g/cm$^3$) than the predetermined numerical range (2.15 g/cm$^3$ or more and less than 2.30 g/cm$^3$), in the case that the blending amount of silica sol was small, it resulted in that fluidity was inferior to that of the examples and the amount of free water was also large (Comparative Example 1), fluidity could be obtained by increasing the blending amount, but the amount of free water was further increased (Comparative Example 2 and Comparative Example 3), and finally, the cement became lumpy, and slurry could not be prepared (Comparative Example 4).

In addition, even when using silica sol E containing nanosilica particles with a true density of slightly smaller (2.13 g/cm$^3$) than the predetermined numerical range (2.15 g/cm$^3$ or more and less than 2.30 g/cm$^3$), it resulted in that the amount of free water was large (Comparative Example 5).

When the aqueous silica sol was not used, the amount of free water was not improved even when changing the blending amount of the set retarding agent, thus it was confirmed that the blending of the set retarding agent did not affect the amount of free water generated (Comparative Example 6 and Comparative Example 7).

From the above results, it was confirmed that the silica-based additive containing an aqueous silica sol containing nanosilica particles with a true density of 2.15 g/cm$^3$ or more and less than 2.30 g/cm$^3$ is a silica-based additive for a cement slurry for cementing that suppresses generation of free water from the cement slurry under high temperature and high pressure environments.

The invention claimed is:

1. A silica-based additive that suppresses, in a cement slurry for cementing in oil fields and gas oil fields, generation of free water from the cement slurry in an environment of high temperature of 100° C. to 300° C. and high pressure of 3,700 psi to 5,000 psi, the silica-based additive comprising an aqueous silica sol containing nanosilica particles with a true density of 2.15 g/cm$^3$ to less than 2.30 g/cm$^3$, and wherein the nanosilica particles have an equivalent sphere-converted particle size calculated from BET (N$_2$) of 20 nm to 100 nm and a particle size by dynamic light scattering method of 30 nm to 200 nm.

2. The silica-based additive according to claim 1, wherein the nanosilica particles have a specific surface area value by nitrogen adsorption (BET (N$_2$)) of 10 m$^2$/g to 500 m$^2$/g and a specific surface area value by water vapor adsorption (BET (H$_2$O)) of 5 m$^2$/g to 65 m$^2$/g.

3. The silica-based additive according to claim 1, wherein the nanosilica particles have a Q4 value of silica measured by solid $^{29}$Si-NMR of 35 mol % to 80 mol %.

4. The silica-based additive according to claim 1, wherein the nanosilica particles have an equivalent sphere-converted particle size calculated from BET (N$_2$) of 5 nm to 100 nm and a particle size by dynamic light scattering method of 10 nm to 200 nm.

5. A cement slurry for cementing, comprising the silica-based additive according to claim 1 at a ratio of 0.1% BWOC to 10% BWOC (BWOC means % by mass based on a dry solid content of cement) as a silica solid content, based on 100 parts of oil well cement.

6. A cement slurry for cementing, comprising the silica-based additive according to claim 1 at a ratio of 0.1% BWOC to 10% BWOC as a silica solid content, water at a ratio of 30% BWOC to 60% BWOC, a cement set retarding agent at a ratio of 0.1% BWOC to 5% BWOC and other additives at a ratio of 0.001% BWOC to 10% BWOC, based on 100 parts of oil well cement, wherein
the other additives are at least one additive selected from the group consisting of dehydration regulators; defoamers; set accelerators; low specific gravity aggregates selected from the group consisting of bentonite, gilsonite, diatomaceous earth, pearlite, pearlite hollow particles, fly-ash hollow particles, alumina silicate glass hollow particles, sodium borosilicate hollow particles, alumina hollow particles, carbon hollow particles and combinations thereof; high specific gravity aggregates selected from the group consisting of barium sulfate, hematite, ilmenite and combinations thereof; cement dispersants; cement strength stabilizers; and lost circulation preventing agents.

7. A cementing construction method, comprising cementing a void part between a stratum and a casing pipe by filling the void with the cement slurry according to claim 5 when mining oil or gas under an environment of high temperature of 100° C. to 300° C. and high pressure of 3,700 psi to 5,000 psi.

8. A cementing method comprising the steps of:
introducing the cement slurry for cementing according to claim 5 into a well, and
condensing the cement slurry for cementing.

* * * * *